A. J. MILLS.
Churn.
No. 61,850.  Patented Feb. 5, 1867.
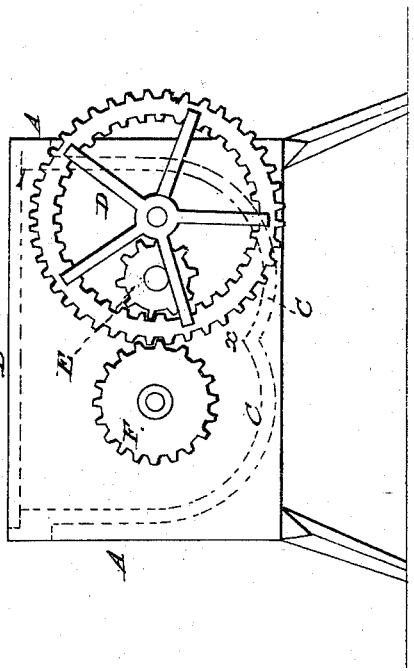
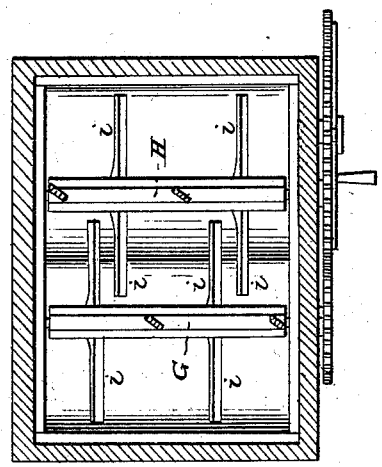
Witnesses:
Inventor

United States Patent Office.

A. J. MILLS, OF SCOTT, NEW YORK.

Letters Patent No. 61,850, dated February 5, 1867.

---

IMPROVEMENT IN CHURNS.

---

The Schedule referred to in these Letters Patent and making part of the same.

---

TO ALL WHOM IT MAY CONCERN:

Be it known that I, A. J. MILLS, of Scott, in the county of Courtland, and in the State of New York, have invented certain new and useful Improvements in Churns, and do hereby declare that the following is a full, clear, and exact description thereof, reference being had to the accompanying drawings, and to the letters of reference marked thereon.

In the annexed drawings, making part of this specification, A represents the box or body of the churn, which is constructed in the form represented, and provided with legs, and a suitable cover, B. The peculiarity in the construction of the body of this churn is in its bottom. Instead of being provided with a bottom which is in one curve from side to side, it is provided with a bottom formed by two or more concaves, C C, separated by a ridge, X. This formation prevents the milk or cream from flowing around without impediment upon the bottom. The ridge X breaks the current as it flows around and sends the milk or cream up toward the arms upon the revolving shafts. D represents a gear-wheel, which is connected to the box at one of its ends by means of a suitable shaft. This wheel has suitable gearing both upon the internal as well as the external edge of its rim, or internal and external periphery. G and H represent two shafts which run through the churn-box, and which are provided on their ends with the gear-wheels F and E, and also provided with the interlapping arms $i$ $i$. One of the wheels F gears into the teeth upon the external rim of the wheel D, and the other into the teeth upon the internal edge of said rim. By revolving the wheel D the two wheels F and E are rotated, and with them their two shafts G and H. The shafts revolve in opposite directions. The wheels F and E being of unequal diameters and number of teeth, their shafts of course revolve at unequal speeds.

I am aware that churns with double bottoms have been used heretofore.

I claim the arrangement of the square or oblong box A, with its ridge X, formed by the interior bottom C C, shafts G H, with their interlapping arms $i$, and exterior gear-wheels D E and F, when constructed, arranged, and operating as set forth.

In testimony that I claim the foregoing, I have hereunto set my hand and seal this 11th day of December, 1866.

A. J. MILLS.

Witnesses:
C. H. DICKINSON,
H. J. RANDALL.